United States Patent [19]

Arney, Jr.

[11] 4,212,928

[45] Jul. 15, 1980

[54] WOOD-POLYMER COMPOSITES

[75] Inventor: William C. Arney, Jr., St. Albans, W. Va.

[73] Assignee: Union Carbide Corporation, New York, N.Y.

[21] Appl. No.: 968,773

[22] Filed: Dec. 12, 1978

[51] Int. Cl.² ..................... B32B 23/08; B32B 27/10
[52] U.S. Cl. ................................... 428/514; 428/541; 428/511; 526/317
[58] Field of Search .................. 428/511, 541, 514; 260/17.4 R, 17.4 CL; 526/317

[56] References Cited

U.S. PATENT DOCUMENTS

| 3,879,357 | 4/1975 | Wingler et al. | 526/317 |
| 3,935,364 | 2/1976 | Proksch et al. | 428/514 |

Primary Examiner—George F. Lesmes
Assistant Examiner—E. Rollins Buffalow
Attorney, Agent, or Firm—Stanley Ktorides

[57] ABSTRACT

Composites of wood cellulose and certain polymeric compositions are formed at the surface of wooden articles and have the property of ready sandability to a smooth, low porosity state, thus making the surface ideal for a variety of wood finishing operations.

2 Claims, No Drawings

WOOD-POLYMER COMPOSITES

BACKGROUND OF THE INVENTION

Wood is the medium of construction for innumerable articles used in many facets of contemporary living. For purposes of convenience, health, design, durability, general aesthetics and many others, the wood surface is often treated by one or more finishing operations such as staining, basecoating, glaze coating, topcoating and the like. However, the successful application of these operations depends upon having a proper surface on which to apply the coatings. The natural wood surface is generally too rough and too porous for the optimum performance of the subsequently applied coating. Addressing this problem, those skilled in the art have, in essence, created a composite material which is formed at the wood surface. The composite material consists of a wood cellulose layer on the surface of the article embedded in a nitrocellulose matrix applied to the surface. The composite material is formed by the application of nitrocellulose polymer dissolved in organic diluents to the natural wood surface followed by drying either in air or in an oven. This wood cellulose-nitrocellulose composite that is formed then serves as the surface to be coated. This new surface displays good sandability leaving the sanded surface smooth and essentially non-porous, as is necessary for good performance by the subsequently applied coatings.

However, this method of altering a natural wood to better accept finishing operations has a number of disadvantages which are becoming increasingly important. Because the nitrocellulose polymer must be applied to the natural wood surface dissolved in organic diluents, large amounts of organic solvent are released to the atmosphere upon subsequent drying. This release of organic solvent creates serious problems of hazard due to flammability and explosion potential and problems of health due to exposure of workmen to the solvent vapors in the workplace and exposure of the public when the vapors are vented to the outside atmosphere. Furthermore the loss of the increasingly expensive organic solvent in the drying step has made this method of wood treatment less and less economically attractive. Measures to deal with these problems such as fans and ducting to control or disperse the vapors and recycle operations to salvage the solvent are costly and energy intensive.

Responding to these problems, those skilled in the art have attempted to devise water-borne latex coatings which avoid the use of high levels of organic solvents. Several such systems have been developed but all have proved unsatisfactory for the treatment of natural wood because the sealed wood substrate has heretofore exhibited poor sandability. The dust created by the sanding operation on these treated surfaces rapidly fuses on to the sanding agent (such as sandpaper) and renders the agent useless in a very short time.

A wood cellulose-polymer composite which can be formed as the surface of natural wood by the application of water-borne polymeric material to the natural wood surface and which creates a new surface which has good sandability characteristics in that it can be sanded to a smooth non-porous finish easily without quickly destroying the sanding agent would be of great advantage.

SUMMARY OF THE INVENTION

It has now been found that certain hereinafter defined polymeric mixtures which are dispersed in water can be applied to natural wood surfaces, and, together with the wood, form a composite material creating a new wood surface which unexpectedly exhibits good sandability characteristics, and, when sanded to a smooth, non-porous surface, is conducive to good performance by subsequently applied coatings in finishing operations.

DESCRIPTION OF THE INVENTION

This invention is a wood cellulose-polymer composite which is formed at the surface of the article to be finished and the process by which this composite is formed.

The wood cellulose portion of the composite is the surface of any article fashioned from any natural wood material including the soft woods such as pine, fir, balsa and the like and the hardwoods such as walnut, oak, cherry and the like. These articles may include fabricated wood pieces such as furniture, veneers, plywood panels, doors, various manufactured boards such as hardboards, particle board or pressboard produced from wood by-products, as well as simple boards such as lumber, flooring, millwork and the like.

The polymer portion of the composite is used as an aqueous latex having a composition, be weight, of from about 50 percent to about 60 percent methyl methacrylate, about 35 percent to about 45 percent ethyl acrylate, about 1 percent to about 8 percent methacrylic acid and 0 percent to about 1 percent pentaerythritol triacrylate containing about 65 percent tetracrylate.

The aqueous latex is produced by first making a premix of the monomers and adding 0.4 weight percent Aerosol OT ®. To a stirred reactor are charged 5 parts of deionized water per part of monomer mix. While stirring, the reactor contents are brought to 70° C. and half of the monomer mix is charged to the reactor. After 10 minutes, 0.01 parts of ammonium persulfate per part of total monomer mix is charged as a 5 percent water solution. After the exotherm subsides, the remaining monomer mix is fed to the reactor at a rate sufficient to hold the temperature at 70°–75° C. After the addition is completed, the reactor contents are held at 75°±5° C. for one hour.

The aqueous latex is applied to the natural wood surface by any of the usual coating procedures used in the art such as spraying, direct or reverse roll coating, brushing, curtain coating, flooding, flow coating, dip coating and the like. Upon application to the cellulose surface there is some penetration of the applied coating into the upper surface of the cellulosic article, while some of the material remains on the surface thereof. The volatile aqueous phase is then removed by drying at ambient or elevated temperatures.

The time required to dry the wooden article will vary and will depend upon the thickness of the coating, the drying temperature, the type of wood and other factors as is known to those skilled in the art.

The wood cellulose-polymer composite is the surface of the wooden article which has had applied to it from about 0.1 mil to about 10 mil of the above-described aqueous latex.

The aqueous latex is known to include surfactants and catalysts used to aid in the preparation of the latex from the monomers mix. Also, if desired, a number of other well-known additives may be included in the latex in order to improve a variety of application and end-use properties. Thus there may be present glycol ethers or other cosolvents to lower the filming temperature of the latex particles, zinc stearate or other sanding aids to decrease friction, and mineral pigments or extenders to provide filling and/or hiding. Similarly, defoamers, biocides, thickening agents, antifreeze agents, neutralizing agents and other additives well known to those skilled in the coatings industry may be useful in the system. The type and quantity of any additive or additives added to the aqueous latex dispersion, if any, will depend on the end use contemplated, the type of wood used and other variables well known to those skilled in the art.

In a typical embodiment, an aqueous latex is produced by the known procedures by reacting methyl methacrylate, ethyl acrylate, methacrylic acid and pentaerythritol triacrylate. To this latex are added the monobutyl ether of diethylene glycol and zinc stearate. The resulting coating composition is applied to the wood surface, dried, sanded and finished.

This invention has numerous uses and will find application wherever a sealer is applied to natural wood prior to a finishing operation such as staining, basecoating, glaze coating, topcoating and the like.

The invention has many advantages over the heretofore available methods of sealing wood so as to prepare it for finishing. Because this system does not require large amounts of organic solvents, there result significant advantages due to decreased flammability and explosion hazard, health and environmental problems, and cost, as well as ecological benefits. Furthermore, compositions of this invention display as good if not better sandability than the compositions formed by use of the heretofore available sealers.

It was completely unexpected and unobvious to find that the wood cellulose-polymer composite, formed at the surface of natural wood when a water-borne latex dispersion composed of methyl methacrylate, ethyl acrylate, methacrylic acid and pentaerythritol triacrylate is applied and allowed to dry, would have such good sanding characteristics, and would yield a sanded surface that is as compatible, or more compatible than that prepared using presently available sealers, with subsequent coats for finishing operations.

For purposes of illustration of the invention and of comparison with typical sealers now in use, two coatings were manufactured, labelled Coating A and Coating B. Coating A represented a typical sealer now in use and Coating B represented one embodiment of the water-borne polymeric latex composition portion of the invention. The two coatings consisted of the following:

Coating A
18.8 weight percent nitrocellulose, coconut alkyd and plasticizer dissolved in a toluol, isopropanol and methyl isobutyl ketone diluent.

Coating B
41 weight percent aqueous dispersion of a latex polymer, said polymer having the composition by weight of 57 percent methyl methacrylate, 38 percent ethyl acrylate, 4.8 percent methacrylic acid and 0.2 percent pentaerythritol triacrylate, to which was added 10 parts of the mono butyl ether of diethylene glycol and 4 parts zinc stearate per 100 parts of polymer. The two coatings were applied to cellulosic wood surfaces as shown in the following examples.

EXAMPLE 1

Two boards of three-ply birch plywood were coated with Coating A and Coating B, respectively, using a No. 30 wire wound drawdown bar. The wet boards were dried for one minute in a forced air oven with an air temperature of 200° C. Four pieces of 2.54 cm.×5.1 cm. of 400 grit sandpaper were accurately weighed and then attached to a metal block having a weight of 900 grams. The weight was then attached to a reciprocating motor in such a way that the block and attached paper moved back and forth in a horizontal direction covering 2.54 cm.×10.2 cm. path at a rate of about 100 strokes per minute. When allowed to rest on a wooden board, this apparatus produced a reproducible sanding action. After 50 strokes each piece of sandpaper was removed and weighed. The results are shown in Table I.

Table I

|  | Coating A | | Coating B | |
| --- | --- | --- | --- | --- |
|  | Test 1 | Test 2 | Test 1 | Test 2 |
| Weight of paper before sanding (grams) | 0.64700 | 0.55445 | 0.57966 | 0.59835 |
| Weight of paper after sanding (grams) | 0.64675 | 0.55571 | 0.57895 | 0.59795 |
| Weight Gain (Loss) | (0.00025) | 0.00126 | (0.00071) | (0.00040) |

The sandpapers used on Coating A were found to show an average weight increase of about 0.10 percent while the sandpapers used on Coating B showed about a 0.10 percent average weight decrease. Inspection of the papers showed Coating A had produced visible build-up of deposits on the paper thereby explaining the weight gain while Coating B produced no such deposits thereby yielding a weight loss as the sanding grit was normally abraded from the paper. The centers of the sanded areas on each board were examined under an electron microscope. At a magnificiation of 100 times, no visual differences in surface smoothness between the surface coated with Coating A and that coated with Coating B were evident. This example demonstrates that the present invention produces coated composite articles having excellent sanding characteristics in that the effective lifetime of the sandpaper is extended through the avoidance of deposits on the sandpaper and also in that the sanded surface is as smooth as the sanded surface coated with a typical sealer now in use.

EXAMPLE 2

The sanding apparatus described in Example 1 was used in the same manner as in Example 1 except that "a thermocouple was placed between the paper and the" metal block. Different samples of the same two boards coated and used in Example 1 were now sanded. After 50 strokes on the board bearing Coating A, a 12.2° C. increase in temperature was measured. After 50 strokes on the board bearing Coating B the temperature increase was only 10.2° C. indicating a 16 percent lower temperature increase. This example further illustrates the excellent sanding characteristics of articles using this invention in that the lower temperature increase reflects reduced drag on the paper resulting in easier sanding manually and reduced power requirements in mechanical sanding.

EXAMPLE 3

A piece of birch plywood similar to the one used in Example 1 was sealed with Coating A on one side and Coating B on the other. The coatings were applied by brush. The board was dried for one hour under ambient conditions and then sanded on both sides using 400 grit paper. Coating A was then brush applied as a clear topcoat to both sides and allowed to dry overnight. The percent reflected light incident at 60° was determined on both sides with the following results:

Side sealed with Coating A: 35±1%
Side sealed with Coating B: 35 ±1%

This example demonstrates that the present invention produces a surface that accepts topcoating with nitrocellulose lacquer that is typical of those used currently by those skilled in the art.

EXAMPLE 4

Three plywood boards labelled I, II, and III were divided lengthwise into equal halves. The upper surface of the boards were as follows:

|     |   |        |
|-----|---|--------|
| I   | — | Pine   |
| II  | — | Oak    |
| III | — | Walnut |

One half of each board was coated with Coating A and the other half was coated with Coating B. The boards were allowed to dry overnight and then were sanded smooth with 400 grit paper. A No. 30 drawdown bar was used to apply an aqueous latex coating consisting of the following:

100 grams of a composition containing
45 weight percent ethyl acrylate
45 weight percent styrene
5 weight percent 2-hydroxyethyl acrylate
5 weight percent methacrylic acid
and 20 grams of $CH_3CH_2CH_2CH_2O(CH_2CH\text{-}O)_2H$ The boards were then placed in a forced air oven operating at an air temperature of 300° F. for 1 minute. The gloss values (60° reflectance) were determined and the results are shown in Table II.

Table II

| Brand | Reflectance | |
|-------|-------------------|-------------------|
|       | Half Sealed with A | Half Sealed with B |
| I     | 25%               | 35%               |
| II    | 35%               | 45%               |
| III   | 65%               | 80%               |

This example demonstrates that the present invention yields a surface more capatible with subsequently applied water-borne topcoats than does a conventional nitrocellulose sealer.

What is claimed is:

1. A composite comprising wood cellulose and as a sealer a polymer of:
   (a) 50 to 60 weight percent of methyl methacrylate, and
   (b) 35 to 45 weight percent of ethyl acrylate, and
   (c) 1 to 8 weight percent of methacrylic acid, and
   (d) 0.2 to 1 weight percent of pentaerythritol triacrylate.

2. A process for the formation of the composite of claim 1 wherein a coating of an aqueous dispersion of a polymeric composition of claim 1 is applied to a natural wood surface which is then allowed to dry.

* * * * *